March 11, 1947.  A. E. SPINASSE  2,417,094
METHOD OF HEAT TREATING GLASS OR LIKE MATERIALS
Filed April 1, 1940  2 Sheets-Sheet 2
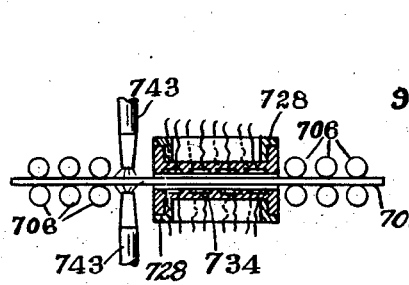
Fig.7.
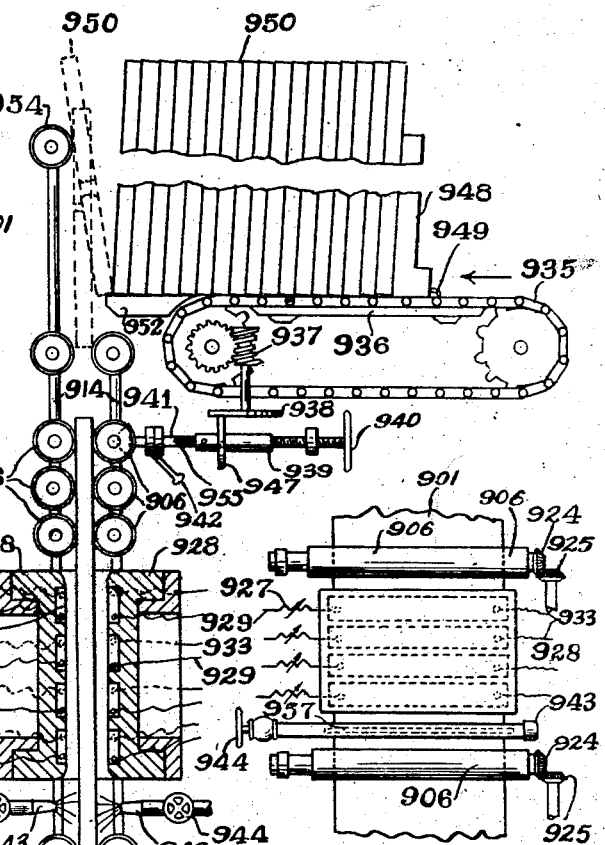
Fig.8.
Fig.10.
Fig.11.
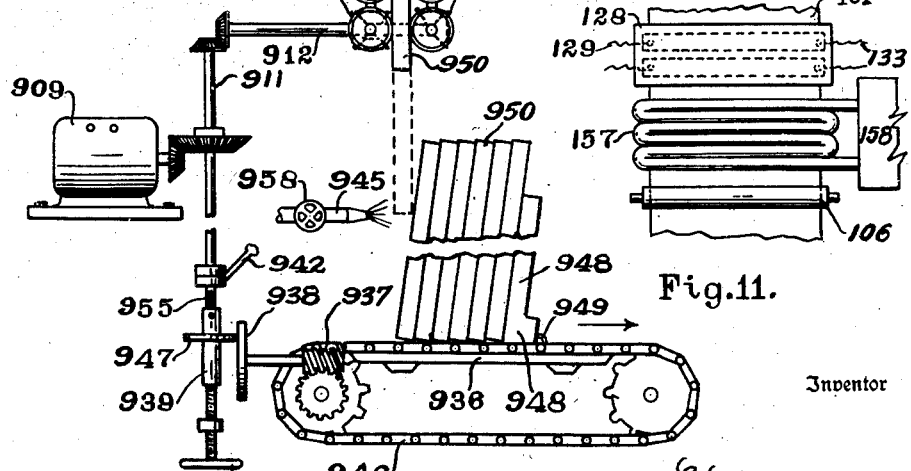
Fig.9.
Inventor
Arthur E. Spinasse Patented Mar. 11, 1947

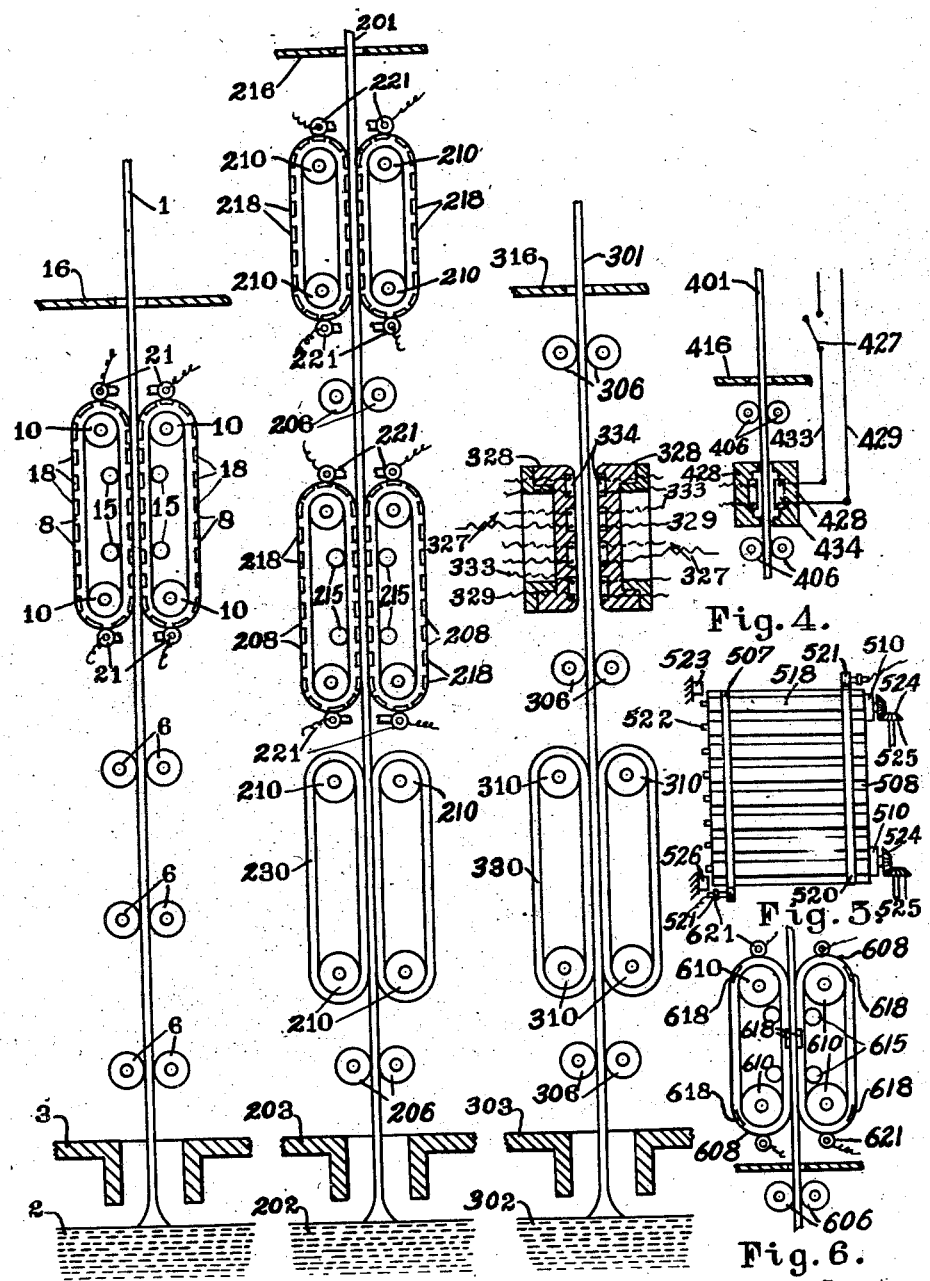

2,417,094

UNITED STATES PATENT OFFICE 2,417,094

METHOD OF HEAT-TREATING GLASS OR LIKE MATERIALS

Arthur E. Spinasse, Mount Vernon, Ohio

Application April 1, 1940, Serial No. 327,166

13 Claims. (Cl. 49—89)

The present invention relates to improvements in the art of heat treating glass sheet or plate to produce sheet or plate of better texture and quality.

The present invention also relates to improvements in the art of tempering or hardening sheet or plate of glass or of other like temperable materials to increase their resistance against shocks and jars and includes improved processes for carrying the invention into effect. The present invention may also be carried out in connection with other articles of manufacture of different shapes made up with different temperable materials.

It also consists in electrically heating sheet or plate glass and other temperable articles of manufacture to high tempering temperature and thereupon promptly cooling the same quickly or desired portions thereof to the desired degree of temper or hardness, thereby increasing the mechanical and thermal or heat resistance thereof.

Another object of the present invention also comprises the heating of the plate to a tempering temperature of about 1000 deg. F. and above and then promptly subjecting the plate to atmospheric temperature and cooling the plate quickly to temper the same.

A further object of the present invention comprises the provision of a method of repeatedly heating and partially cooling the sheet or plate at intervals, but preferably successively at lower temperature for each stage of the process to thereby govern and produce the desired degree of uniformity of temperature and temper in the sheet or plate and thereby also improve the character thereof.

Another important object of my present invention comprises the provision of a method of operation for electrically tempering or hardening a sheet or plate of glass or other articles of temperable materials of substantial sizes with a relatively small or long narrow heater means, and passing the plate or article through or between the heater means at the desired speed. This improved process consists in first heating and afterward cooling the sheet or plate to the desired temperature but only a small portion at a time, preferably a long narrow portion transversely of the plate, that is, little by little or by degrees, and thereupon, after said portions are sufficiently highly heated, promptly cooling the same as it passes out from the heater means and progressively continuing the process until the plate as a whole, or desired part thereof, is tempered. With my present improvement and new process of tempering by heating and cooling the sheet or plate piece meal, the plate may be heated to the softening point anywhere between 1000 degrees F. and 1150 degrees F. or above with less chance of sagging, stretching or deformation, as would be the case in heating the sheet as a whole.

A further object of my present invention also includes the steps of rapidly electrically heating the sheet or plate along spaced apart lines or strips and then promptly cooling the heated portions of the plate to temper the same along lines spaced apart from one another. Such method is carried out either by direct heating contact or by close spaced proximity of electrical heating means or strips so that a sheet or plate may be produced with tempered lines or strips parallel to one another or intercrossing each other at desired angles to produce any desired patterns of tempered glass. The plate or article may also be quickly electrically reheated to a high temperature, but only to a limited depth from the surfaces thereof and then promptly cooled quickly for tempering and hardening the heated portions. The plate or article will be only partially tempered since the interior portion remains untempered.

Other objects and advantages of the invention will be clearly understood from the following description of certain approved forms of apparatus and method of operation.

In the accompanying drawings illustrating examples of my invention

Figure 1 is an edge view of a sheet or plate glass drawn from the molten glass with my means for reheating.

Figure 2 is a similar view showing substantially the heating means shown in Figure 1 with a shielding means for the sheet and a second heating device above the first one.

Figure 3 is a similar view partly in section including a sheet of glass with a shielding belt and a reheating device spaced from the sheet.

Figure 4 is a detail in section of a modified form of heating device.

Figure 5 is a front view of a heating device such as shown in Figures 1 and 2 with means added to move the same and automatic means for making and breaking the circuits for the heating elements.

Figure 6 is an edge view showing the heater members more widely spaced than in Figures 1 and 2 where the construction is used in cutting sections from the sheet.

Figure 7 illustrates means partly in section for reheating and cooling a sheet or plate for tempering, said means being arranged for passing the sheet horizontally through it.

Figure 8 illustrates a series of devices such as shown in Figure 7, arranged for passing the sheet or plate through them for heating and cooling the same.

Figure 9 is a view for automatically feeding, tempering and discharging sections of sheet glass of commercial size.

Figure 10 is a detail front view of the heating and cooling device shown in Figure 9.

Figure 11 is a detail front view of the electric heating device and an improved curtain cooling device for cooling the sheet or plate to be tempered.

With respect to Figure 1, a sheet or plate of glass 1 is being drawn from a bath of molten glass 2, passes between pairs of rolls 6—6 and between fireproof belts 8—8 preferably made of asbestos fabric which move around rolls 10—10. These rolls are mounted on suitable supports so as to exert yielding tractive pressure upon both faces of the glass sheet or plate being drawn. They are actuated by suitable beveled gears such as the gears 524 and 525 shown in Fig. 5 and driven by a suitable source of power. Auxiliary pressure rolls 15—15 serve to maintain the surfaces of the belts adjacent to the faces of the drawn sheet or plate of glass. The belts are provided with a series of preferably flexible heater strips 18—18 of high electrical resistance and attached in close spaced relation across the faces of the belts which contact with the faces of the sheet or plate. These strips may be attached to the belts by any suitable means, for example, clamps or rivets, and move automatically upwardly in contact with the glass and downwardly when freed from contact with the glass. The heater members 18—18 contact with conductors such as the conductors 507 and 520 shown in Fig. 5 and connect to a source of electricity so that they may be energized and heated to the desired degree for heating the glass for rapidly tempering the plate. I prefer to attach the conductors referred to above on the external surface of the margin of each belt beyond the edges of the sheet or plate. To maintain electrical current in the strips, I provide contact wheels 21—21 connected with a source of power and with said conductors.

The strips are arranged at regular intervals so that at least one or more pairs of them will come in engagement with the faces of the sheet or plate as or before the one pair or pairs in advance move out of contact. The belts also cause the sheet or plate to move upwardly where they are cut transversely to desired sizes at point 16 as they emerge from said belts.

In Fig. 2 many of the same parts are shown as are shown in Fig. 1 being designated by similar numerals with the addition 200. Similarly in Figs. 3, 4, 5 and 6, similar parts are designated by like numerals with the addition of 300, 400, 500 and 600, respectively. Automatically actuated means may be provided for cutting off the current from the heater strips which are not in contact with the glass, such means being shown in Figure 5, a front view of the heater members described, and comprising push button or toggle switches 522 arranged for connecting and disconnecting the heater members 518 to or from conductor 507. These switches can obviously be of the well known spring-back type such as will alternately make and break the circuit when actuated in the same direction and are disposed to move with the belts so that when said switches come in contact with the fixed members 523 and 526, they will be depressed and short circuited to send the current into the heater members 518 and thereby heated, as they are about to engage the glass sheet or plate such as the glass sheet or plate 1 shown in Fig. 1, and when leaving contact with the glass, said switches will again be depressed by engaging member 523 at the upper end of the belt or belts to thereby cut off the current from said heater members.

As an example, when using my improved means and method for the rapid tempering of glass, I prefer to use the heating strips or members in close proximity to each other and on relatively short belts, which short heaters are located remote from the source of generation of the sheet and above the heat shielding means 230 shown in Fig. 2 and 330 shown in Fig. 3 where the atmospheric temperature is cooler so that when the highly heated sheet or plate is thus exposed it is more rapidly cooled and tempered.

The temperature of the drawn glass at the source of the drawing is about 1800 degrees F. I cool the surface portion of the sheet more or less rapidly, for example, in this instance, to about 800 degrees F. At this time the sheet or plate may be 18 or more feet remote from the drawing zone. I now pass the sheet between a pair of asbestos belts lined with heater strips 18—18 electrically heated to about 1000 degrees F. more or less. When contacting with the glass, it is, of course, understood that the heating strips must not be heated to the point where they would tend to adhere to the glass, which temperature may be approximately between 1600 degrees F. to 1800 degrees F. in temperature. When not contacting with the glass, as will be pointed out later, the temperature may be much higher.

In the present instance, the strips come in direct contact with both faces of the sheet for a time sufficient to raise the temperature of the external portions or surfaces thereof with respect to the internal body portion, the sheet being then rapidly cooled by promptly exposing the same to a cooling atmosphere or elements. It will be understood that the first cooling of the external portion of the sheet or plate to about 800 degrees F. leaves the central portion of the glass sheet or plate at a higher temperature, say, 900 to 1000 degrees F. depending on its thickness of wall. Assuming that the thickness of wall is $\frac{3}{32}$ of an inch, when the external surface portions of the plate are reheated to a tempering temperature, 1000 degrees F. or more, to a depth which may vary from $1/64$ to $\frac{3}{32}$ of an inch, it leaves the plate in a more uniform temperature throughout its body, so that when subjected to the cooling action of the atmosphere or to other cooling elements the result is a uniformly tempered plate of glass.

The strips or resistors 18—18 may be ½ to 8 inches in width and $1/64$ of an inch in thickness, and may be set in close proximity to each other, $1/64$ or $\frac{1}{16}$ of an inch apart more or less and their temperature preferably controlled independently by means of controllers similar to the controllers 327 which are indicated in Fig. 3 as provided in the leads 329 for regulating the electric current passing through said leads. In Fig. 4 there is shown a controller 427 for controlling the electric current passing to the heater elements 434. Of course, the forms or sizes of these strips or resistors, as well as the dimensions of the adjacent portion of the belts or support for the resistors may be varied at will depending upon the thickness of the glass, the depth to which the glass is to be reheated, and in a general way the nature of the article to be heat treated. Too, at times it may be found desirable to maintain the heating element in adjacent spaced relation to the surfaces of the glass and in such case, the heating members may be held stationary upon suitable refractory materials or walls, which walls may be of suitable forms to enclose the sheet or plate to be tempered, for example such as shown in Figure 3. In Figures 3, 4, 7–9 are shown fractional edge views, and in Figure 10 is shown a front view of such heater device, 328, 428, 728, 828, and 928, respectively, are the fixed walls or support members at the sides or about the glass sheet 301, 401, 701, 801 and 950, respectively, and spaced out of direct contact therewith, the sheet or plate being movable between said members or through said heater members by means of suitable carriers or rolls 306, 406, 706, 806 and 906, respectively.

For example, as shown in Fig. 3, the heater elements 334 receive the electric current from a suitable source through leads 329 connected at one end of said elements and also to similar leads 333 connected at the other ends of said elements as shown. The circuits are each provided with ordinary independent controlling means 327 so that the temperature of said elements may each be controlled independently. Similar parts in Figs. 4, 7, 8 and 9 are designated by the same numerals as those used in Fig. 3 with the addition of 400, 700, 800 and 900, respectively.

In tempering large glass objects, it may be found desirable to repeat the heating and cooling treatment. In so repeating the heating and cooling treatment, the succeeding reheating should be to a temperature not greater than that of the previous heating, but may be either to a lower temperature or for a shorter period of time, as desired.

Distinct heating elements may be used for this purpose, for instance as follows: First, using suitable carrying or drawing members or devices for the sheet or plate for a short distance, cooling the sheet to the required temperature or set condition, say 10 feet, then passing the sheet between a relatively short heating member, say 16 inches in length, again cooling the sheet to a greater degree than the first cooling for a relatively short distance of say 6 feet upon a suitable carrier, then reheating to a degree less than the first reheating with a still relatively shorter reheating means, say 8 or 10 inches in length, and finally cooling sheet to normal. Between each reheating, the sheet may be cooled by exposure to a cooling atmosphere, and at times by suitable cooling means and elements. For annealing this process is carried out far below the strain point but for tempering, it is not. For tempering as in this case, reheating is preferably above the strain point or above 932 degrees F. before the final cooling, the cooling also being prompt and rapid after the last reheating. Of course, this can be varied at will and this description is thought to be ample so that anyone versed in this art can proceed to obtain suitable tempering of the glass within a brief period of time.

As another example, the external portions of a sheet or plate may be rapidly cooled to about 900 degrees F. or to 1000 degrees F., thereby leaving the central portion thereof about 1100 degrees F. to 1150 degrees F., and then said sheet or plate is promptly reheated to either one of the last two named temperatures and thereupon promptly cooled and tempered. When the glass is reheated above 1000 degrees F. or 1100 degrees F. in temperature, I prefer to use a stationary heater 328 in spaced relation to the plate or article treated, such as illustrated in Figure 3.

It will be understood that when the plate is reheated to 1000 degrees F. or more, the plate is reheated approximately to or above the softening point of the glass, that is above the strain point. The plate is then promptly cooled and tempered by the present improved means and steps of the process herein described.

In Figure 9 is shown a side view of an automatic device for tempering sections of sheet or plate glass 950 of desired sizes which may be cut from the sheet or plate 1 shown in Figures 1–3 and 6. A supporting carrier 935 is loaded with commercial sections of glass sheets or plates as shown at 950 to be heat treated or tempered. The plates treated are delivered between asbestos covered rolls 906, which support and guide the movement of the plates downwardly through the heater member 928 and, as the highly heated plates emerge below said heater, they are promptly cooled or quenched by subjecting the same to a suitable cooling atmosphere or to any suitable cooling elements such as by a flow of cooling air, gaseous fluid or liquid spray at the desired low temperature directed upon the hot surfaces thereof by suitable blowers or pipes 943 which may have a slot 957. The spray of cooling fluid, under suitable pressure, may also be sprayed upon the article treated by use of the cooling members illustrated in Figs. 7 and 8. Before tempering the sheet or plate it may be heated anywhere from 932 degrees F. to 1500 degrees F. or even to a greater temperature depending on the quality of the glass, the shape of the article, and the nature of the material to be tempered. The cooling elements are supplied from a suitable source under the desired pressure regulated by means of valves 944. When water or water spray is used for cooling, the oxygen is preferably reduced or removed from it to reduce or prevent oxygenation of the particular article treated, which may be made of an oxidizing material. The tempered plates are then received by another set of supporting and guiding rolls 906 beneath the heater member and discharged upon another carrier 946 and then carried out for packing. Pipe 945 having controlling valve 958 directs air under pressure from a suitable source upon each tempered sheet and plate delivered upon the carrier 946 for stacking the same together as shown. In this manner, the expense of treating the plate is extremely small and tempered sheets or plates are made available to the trade at a relatively low cost. Such treated glass has a substantially increased resistance against thermal shock and mechanical shocks and jars.

A motor 909 through the gears shown on shafts 911, 912 and 914, operates the rolls 906 which support the individual plates 950 through the heater or furnace 928 for tempering. A shaft 941 operated from shaft 914 has a longitudinal slot 955 engaged by a key in the sleeve 939, the sleeve 939 being provided with a wheel 947 frictionally engaging a disk 938 which operates the carrier 935 by means of a worm and gear 937. Wheels such as 940 having threaded shafts rotatably connect to sleeves such as 939 that serve to regulate the speed and direction of movement of carriers 935 and 946. The carriers also have supports 948 for the plate of glass and a table 936 to sustain the weight of said plates.

The carrier 935 moves the plate to the left and the foremost plate slides on to another short table 952. In operation as shown by dotted lines, the sheet or plate alternately slides down to be picked up between rolls 906. Preferably, the upper portion of a plate section 950 falls forward upon asbestos covered roll 954 which preferably is idle, while the lower portion thereof is still partially supported upon the forward edge of the table 952 and destined to pass downwardly between the asbestos covered rolls 906 mounted very close thereto and the plate is now started on its journey to be heated, cooled and tempered preferably a portion thereof at a time, the rolls 906 above the relatively narrow electric heaters 928 holding the sheet or plate before it is heated in passing through said heater means and the rolls 906 beneath said heater means holding the now tempered sheet or plate passing out as shown at 950 after being cooled by the cooling fluid from pipes 943 or by cooler device 157 shown in Fig. 11. The tempered section of sheet or plate is shown as delivered upon the carrier 946 adjacent the support 948. Clutch 942 may be provided to control the carrier means 935 and 946 and the lower receiving carrier 946 is similar to and operates substantially the same as the one above described with the exception that the supporting surface of the carrier moves to the right. The clutch 942 may be of any well known clutch form such as is well known in the art. From the above illustrations and description, it will be clear that the time and speed of the discharging and receiving of the plates can be regulated to obtain the desired degree of temper in the sheet or plate and also the proper accumulation of the plates upon the receiving carrier means 946. The direction of movement of the carrier may be reversed for recharging and the supports 948 for the plates are also removable and attachable at the desired point on the carriers by suitable means such as latches 949. When the device ceases operation, the carriers 935 and 946 may be reversed to desired position by reversing the direction of rotation of motor 909. Either clutch 942 may also be disconnected and either carrier moved to desired position by the means provided.

The air discharging members 943 are connected to a suitable source or means for discharging air or other gas for applying to the highly heated sheet or plate, and which air or gas is preferably maintained at the desired temperature.

While cooling air may be blown upon the sheet or plate by suitable known means, I prefer to subject the highly heated plate or article to be cooled to a cooling atmosphere as quiescent as practicable. This is accomplished by subjecting or passing the highly heated sheet or plate between curtains of zig-zagging pipes closely spaced from the sheet or plate and through which pipes cooling water is circulated. At times a refrigerant may be circulated through such pipes from any suitable refrigerator means. Said cooling pipes may be made of suitable metal, preferably of good heat conducting material such as copper in order to dissipate the heat more rapidly. The temperature of the cooling element may be maintained at between 32 degrees above zero F. or lower. While intensive cooling of the highly heated plate or article tempered may be desirable, in some cases the tempering takes place at atmospheric temperature which may be anywhere from zero to 100 degrees F. or greater than this temperature. By passing the heated plates or articles between such curtains of cooling pipes, the strong cooling by a substantially quiescent atmosphere will result in the avoidance of strong eddy currents of the cooling atmosphere and in a more uniform tempering of the sheet or plate.

In Figure 7 is shown a plate 701 tempered piecemeal, the plate being moved horizontally flatwise upon suitable rolls 706 or carrier and cooled by a blast of cooling air as it emerges from the heater 728.

In Figure 8 the plate 801 is moved vertically by rolls 806 and alternately heated and cooled as it passes through the heater member 828 and cooled by forced draft from pipes 843 between each reheating. The degree of heating and of cooling may be the same or different for each stage. After the last reheating, the plate is promptly tempered.

When the plate is treated through its thickness, or the superficial portions of the plate are treated piecemeal by degrees as above described, the plate or article treated can be heated quickly above 1100 degrees F. in temperature with less likelihood of deformation due to the prompt cooling action which follows the heating of relatively small sections of the article processed at a time. By this improved process a very large plate can be easily handled and uniformly heated and tempered which would not be the case were the plate heated in a large furnace.

In the case of tempering large sheets or plates, for example, 6 x 12 feet, it is not only expensive but difficult to use a large furnace to at once take care of such large size plate with uniformity of result. With my present invention, large size plates, for example 6 x 20 feet, or even larger can be easily handled and uniformly heated and tempered and this with a heater means which may not be larger than 6½ feet long and 12 inches wide, such heater being preferably open at top and bottom with the side walls thereof facing each other and located along a narrow portion of the plate one on each side thereof, so that the plate may pass upwardly or downwardly therebetween. Of course, the plate could be caused to move in a horizontal direction through the narrow heater, and in case of very large plates horizontally flatwise therebetween.

The higher the temperature of the heated plate as it emerges from the heater, the cooler the atmospheric temperature or other cooling element should be by comparison. Glass thus heated may be tempered as distinguished from annealing by subjecting the glass to the proper cooling atmospheric temperature.

The temperature of the heater device may be anywhere from 1000 degrees F. to 2500 degrees F. or above. The speed at which the plate is passed between the heater elements determines the degree of heat imparted to the plate, thus any degree of temper from maximum to minimum can be obtained at will as well as any degree of depth the article is to be tempered beneath the surfaces thereof; the plate being rapidly cooled as it emerges from the heater means. Different degrees of stresses and temper may thus also be obtained in different layers of the plate.

Commercial plate glass has ground and polished surfaces, which surfaces are somewhat porous and easily scratched as compared with fire finished surfaces. Such plate glass can be improved by treating the surfaces thereof as herein described to increase the resistance thereof against shocks and jars and against defects created by surface friction. Glass heated to the softening point of the glass, say 1000 degrees F. and promptly subjected to cooling atmospheric temperature will be tempered, the softening point of sheet or plate glass being about 932 degrees F.

In Figure 10 the heater member is shown as provided with the electrical controllers 927, the rolls 906 and slotted pipes or air blowing devices 943 extending transversely across the plate are shown. The heater member 928 in the instance referred to includes external refractory walls and a series of electrical heater members such as are shown at 934 in Fig. 9 mounted therein. The temperature of the electrical heater means may be raised to two or three thousand degrees F. or even much above said temperature. When a thin surface layer or surface temper is desired, the sheet or plate is passed through the heater at increased speed, and at lower speed when a deeper tempered layer is desired. Ordinarily the plate is passed through the heater at a speed to raise its temperature to between 1000 degrees F. and 1200 degrees F. depending on the nature or quality of the glass or material treated and then it is promptly cooled by subjecting the same to a suitable cooling element.

It will be understood that my present invention herein claimed is directed to improvements in a process for tempering or hardening plates or articles of temperable materials, and that the heating of the plates or articles to be stressed and tempered must be at or above the strain or softening point and promptly followed by rapid cooling. For example, if the softening point or critical strain point of the glass is about 932 degrees F., the material must be reheated to at least such temperature. The thus treated glass sheet or plate is then promptly cooled rapidly below 932 degrees F. to atmospheric temperature.

My improved device is also useful in other respects. In Figure 4 is shown the sheet or plate passing through the floor 416 where the sheet may be cut to desired length. At times downwardly extending cracks may originate in the sheet and may keep gaining toward the hotter portion of the sheet occasioning breakage of the glass and delay. At 428 is shown a long narrow stationary heater member extending spaced from the glass on each side transversely of the sheet. Such heater may be used to stress and temper the sheet but also to remove cracks from the sheeet. The resistors 434 of the heater member are disposed opposite to each other and are included in a circuit 429 from a source of electrical power which is controlled by a switch 427 so that the heater member may be brought up to the desired temperature. When a crack originates in the sheet, the switch is closed, the heater member is energized and heated, the sheet is then heated along a transverse line beneath the crack so that the crack, which remains above the heated portion of the sheet, will be removed from the glass in the upward movement of the sheet.

In Figure 6 are shown the flat strips 618 arranged at regular intervals upon belts 608 so that at least one of them will automatically come into engagement with the face or faces of the sheet as or before the one in advance moves out of contact from the sheet. Preferably the strips are arranged to engage the faces of the sheet in position opposite to one another. This device can also be used with advantage for cracking sections from the sheet, the strips being spaced apart on the belts a distance corresponding to the size of the sheet section to be cut. The sheet or plate is then automatically heated along the desired line or lines transversely of the sheet without nicking the glass, and along which lines the glass is cracked to remove sections from the sheet. Conductors 507 and 520 such as shown in Figure 5 may also be used, of course, in connection with the heater strips 618, also contact wheels 621. The stops 526 and the switches 522 can also be used in this connection to energize any of strips for cutting sheet sections of different desired width. The strips are preferably heated anywhere between 800 degrees F. to 1000 degrees F. when in contact with the glass for a short period of time to heat the glass along the desired lines. The switches 522 can also be operated by hand when desired.

The advantages of such automatically operated device with flat heater means for cutting off sections of predetermined commercial width from the foremost portion of the sheet or plate will be realized by those skilled in the art.

In Figure 11 is shown a sheet or plate 101 passing downwardly through, or between, a long narrow heater means 128. As the heated portion of transverse section of the plate emerges from the heater means, it is promptly cooled between curtain of cooling pipes 157, through which pipes circulate cooling water or any suitable refrigerant from a source 158. A curtain of such cooling pipes is located on each side of the plate 101, transversely in close spaced relation thereto and out of contact with the plate. The fact that the pipes are disposed lengthwise at right angle to the direction of movement of the sheet or plate assures uniformity of result in the process of cooling the plate.

My present invention is quite useful in tempering thin sheets, plates or panels made up of temperable materials, $1/64$ of an inch or less and up to $1/8$ to $1/4$ inch in thickness, and this is especially true when the sheet or plates are large and spacious and made up of glass, steel or temperable alloys. As an example, taking a sheet 6 feet wide and 20 feet long, ordinarily it would be quite difficult to reheat and by cooling stress and temper the same as a whole at once, and it would be even more difficult, if not impracticable, to reheat and stress and temper the surfaces or surface layers thereof to a predetermined restricted depth. This is further especially true to produce a plurality of differently stressed and tempered layers or stratified tempered plates and panels and the like. With my present described improvements, such articles can be quickly heated and tempered with accuracy and with the exact degrees of stress and temper and desired restricted depth. By heating, cooling and stressing and tempering the plates piecemeal or a restricted portion at a time continuously, preferably under uniform speed, a uniform result is obtained throughout the plate. Of course, the process and device can be controlled and modified to slow down or increase the speed of passing thicker or thinner portions of an article through the heater to thereby obtain uniform or desired degrees of heating and tempering.

As distinguished from tempering as above pointed out, my improved device is also highly useful in carrying out an improved process for rapidly stabilizing the molecular structure of the sheet or plate or bodies of glass of great thickness. In this instance, while the plate may be first heated approximately to the softening point, repeated cooling and reheating is resorted to but with the reheating therebetween carried out at successively lower temperature to such point as to avoid tempering.

For example, in the case of a thick plate of glass heated to about 932 degrees F. the plate is rapidly cooled to about 600 degrees F. Now the plate is promptly reheated quickly to about 800 degrees F. and then rapidly cooled to about 500 degrees F. Again the plate is anew quickly reheated to about 700 degrees F. and then quickly cooled down to about 300 degrees F. Finally the plate may still be promptly reheated quickly to about 500 degrees F. and thereupon cooled down to normal temperature. The cooling and reheating may be prompt and rapid, by subjecting the plate to a strong cooling element so that the external layers thereof are reduced in temperature more than the inner portion thereof, and the reheating may also be rapid by subjecting the plate to a strong heating element to thereby only raise the temperature of the external layers of the plate equal to or approximately to that of the inner portion thereof, and then repeating at successively lower temperature until the process is completed. Many modifications are possible in carrying out the steps of the process for stabilizing the molecular structure of large masses rapidly. The last steps of the process may be omitted and the steps of reheating and cooling modified and carried out within or below the so-called critical annealing range for glass. The above described process produces plates superior in qualities over those treated by the conventional annealing methods. Less equipment is required and desired accurate results are quickly obtained.

In my present improvements the processes are preferably carried out by the use of electrical means for heating the glass or articles treated, including means for varying and controlling the current of electricity used and thereby the accurate heating and tempering of the article treated. The provision of electrical instrumentalities for heating the plate or other articles to tempering temperature and then promptly cooling the plate or article quickly to temper and harden the same is made. The electrical heater device includes either resistors or conductors or the like which are used either in direct contact with or in suitable spaced relation to the processed article. The heating of the articles by electrical means is quite rapid and preferably by radiation. It is obvious that the article processed may be stationary with respect to the heater means but, as herein shown and described it is preferably movable with respect to the heater means. When it is desired to reheat the article treated to a high temperature but only to a shallow depth beneath the surface thereof, the electrical means used for heating the articles must be very high in temperature, or must be capable of imparting high heat quickly to the article treated. The time for heating must be short, at times only seconds, at other times only minutes depending on the nature of the articles treated and the depth at which the article is to be reheated. The heating of the surface or surfaces of the article is limited to a restricted depth or layer therebeneath less than that of the entire cross section of the article treated, and the temperature imparted should be quite high, anywhere from cherry red to glowing red heat, and at times even up to incandescence, and rapid cooling of said heated surfaces or portion should promptly follow to thereby temper said heated portion mainly and before the imparted heat has had time to penetrate greatly beyond the desired or predetermined restricted depth in the plate or article treated. For example, if it is desired to temper or harden a section of the temperable article from $\frac{1}{8}$ to $\frac{1}{4}$ inch in depth, this can be quickly effected by electrically heating the article.

Articles of different form and materials can, of course, be heated and tempered in accordance with my present invention. While air may be used as the quenching element for the heat of the article treated, a spray of cooling fluid can be directly applied upon the heated surfaces depending on the nature thereof and the part to be strained or tempered and hardened. Articles $\frac{1}{8}$ of an inch up to several inches in thickness, such as sheets or heavy plates can be quickly tempered at their surfaces to the desired depth anywhere from a thin surface layer to $\frac{1}{3}$ of the entire thickness of the article treated, leaving the rest untempered. While I have particularly discussed heat treating flat sheet glass or plate according to my present invention, it is obvious that the plate may be curved and that different shaped articles of glass and made up of other materials that are temperable, for example cylindrical or tubular in shape, and such as strips or bars, or round, square and other shapes in cross section may thus also be quickly and accurately tempered and hardened. Such bars or articles can be effectively treated with the apparatus shown and described in Figure 9. The surface layers of such article may also be tempered piece-meal or by degrees lengthwise by passing the same at the desired speed through relatively small electrical heater means surrounding the same and modified in form to approximate that of the cross section of the article treated, the succeeding portions emerging thereof being promptly cooled and accurately tempered to the degree of hardness and depth sought substantially in the manner herein particularly shown and described.

When the plate is treated throughout its thickness or the superficial portions of the plate are treated piece-meal, or by degrees as above described, the plate or article treated can be heated quickly to or above the critical range thereof with less likelihood of deformation due to the prompt cooling action which follows the quick heating of relatively small sections at a time of the article processed.

For tempering or hardening articles having a large surface area such as sheets or plates of glass where uniformity of result is of prime importance, the use of electrical heating application is the most effective application of heat to the articles treated. It speeds up production and reduces cost, and uniformity of heating is secured, thus improving the product and process while greatly reducing the number of rejects. There is a material saving in equipment and floor space. By use of electrical heating applications to the article treated, dependability and accuracy of control of heating and heating cycles is secured and improvements in the final product in strict accordance to industrial requirements may be obtained. Radiating heat from highly heated resistors is also uniformly distributed, thus doing away with dangerous different tempered spots. The tempering operations by electrically generated heat are performed more quickly and more regularly and are best suited for automatic control and make it possible to govern the supply and time of heating in accordance to the demand of heat and degree of penetration. In view of the above, it will be seen that in continuously heat-treating or tempering articles of great length, a small portion thereof at a time by the electrical heating process, uniformity of results is nevertheless obtained in the final product.

In Figures 1-3 the successive portions of the sheet or plate pass between the electrical heater means such as is shown at 8 in Fig. 1, at 208 in Fig. 2 and at 328 in Fig. 3 and are rapidly reheated to a predetermined temperature and depth, which temperature may vary anywhere between 800 degrees F. to 1100 degrees F. depending on the material treated. When the heated portions emerge from the heater means, they are promptly cooled by subjecting the same to a cooling atmosphere or to other suitable cooling elements which may have a suitable cooling capacity up to or below 200 degrees F.

Referring further to Figure 9, the sheet, plate or articles treated are individually successively guided between the heater members preferably at a given uniform speed. Means are provided for conducting electric current through the conductors or resistors which form part of the heater members for heating the same to incandescence in temperature. Each of said plates is also passed only a portion thereof at a time between the incandescent heater means and is successively heated to incandescence or tempering temperature and then promptly quickly cooled and tempered or hardened as it emerges from the heater means. It will be observed also that a relatively small portion of the article can thus be treated at a relatively higher temperature to obtain a greater degree of hardness, and this is especially true because the successive portions of the article are free from contact with supporting means while being heated. The speed of movement for the portions of the plate or article passing between the heater means may be varied to obtain different results or degrees of temper and hardness at different points therein. The heating capactiy of the heater may be uniform on each side of the plate as well as the cooling action of the heated portion but may also be varied as desired. One side of the plate may be tempered only or one side partly tempered.

The automatically operated device for severing sections from a sheet or plate shown in Figure 6 may also be disposed edgewise or flatwise horizontally. The horizontally disposed conveyor is also suitably supported by means such as wheels 615, and the non-nicking electrically heated strips 618 are suitably connected and arranged at desired intervals upon the surface of the belt or conveyor and preferably automatically heated at predetermined intervals for severing sections of the plate without any softening of the glass. Preferably the heater members are arranged along lines transversely of the carrier and plate and are operated so that two or more of these heater means will be in heating contact with the surface of the plate at the same time on at least one side of the plate, thereby effecting a great saving of time in severing the sections. At times a single conveyor may be used with the electrical heater means arranged to contact with only one side of the plate but preferably there is employed a series of spaced apart heaters for rapidly heating and severing the plate into sections of predetermined sizes. Conveyors such as the conveyor 8 shown in Fig. 1, the conveyor 208 shown in Fig. 2, and the conveyor 608 shown in Fig. 6, arranged with a suitable number of heaters transversely thereof may be employed. Conveyors such as the conveyor 946 shown in Fig. 9 which may be operated automatically or by hand may also be employed.

In cracking off sections from a sheet or plate anywhere from $\frac{1}{16}$ of an inch to 1 inch or more in thickness, the time required to properly heat the glass along the lines at which it is desired to crack the glass is approximately between 15 seconds and one minute or longer depending on the nature and thickness of the glass. It is not desirable to use the heater means at a too high temperature for fear of causing minute transverse checks along the edges of the sections being cut. With my improved device, this loss of time is reduced greatly or eliminated and the rapidity of severing sections from the sheet or plate increased and can even be faster than with the use of a cutter-wheel or diamond, while at the same time obtaining better cut edges in the plate.

In the case of double strength sheet or plate up to $\frac{3}{16}$ of an inch in thickness about 20 to 30 seconds will be required for heating the glass along the desired lines before cracking the glass, but in applying 10 or more heater members in distanced heating contact with the surface of the plate at the same time, and moving the sheet at the required speed, a section may be cracked or separated from the plate every two seconds or less at the cutting station depending on the number of heaters used at the same time.

In this manner, by using the right number of heater means at the same time, the cutting of sections of predetermined sizes from the plate is speeded up resulting in a great saving of time. Moreover with the present means and method of operation, sections from sheets and plates of glass may be rapidly separated in substantially exact sizes, straight sectional cut, and such as will require a lesser degree of grinding or polishing of the cut edges when required.

The form and dimensions of the parts herein shown can be modified within the skill of the ordinary expert in the art without departing from the gist of the present invention as claimed.

The invention described and claimed herein is a continuation in part only of my copending application for patent Serial No. 528,766 filed January 12, 1922 which was issued April 23, 1940, as Patent No. 2,197,811.

Certain of the subject matter disclosed herein but not claimed, is claimed in my divisional application Serial No. 657,561, filed March 27, 1946, for Means and method for treating glass.

What I claim is:

1. The method of heat treating a sheet of glass which comprises heating the sheet over an area having dimensions at least equal to the width but narrow with respect to the length of the sheet, cooling the sheet over an area adjacent the heating area and of dimensions similar to those of the heating area, the combined width of those areas being less than the length of the sheet, and moving the sheet of glass continously adjacent and past the heating and cooling areas to progressively heat and then cool the glass sheet to thus complete its treatment.

2. The process of heat treating a sheet of glass as defined in claim 1 wherein the cooling of the sheet is effected by applying cooling air under pressure thereto.

3. The process of heat treating a sheet of glass as defined in claim 1 wherein the cooling of the sheet is effected by applying cooling air under pressure to the sheet and wherein the sheet is moved vertically downwardly past the heating and cooling areas.

4. The method of tempering a sheet of glass having predetermined dimensions which comprises heating the sheet over an area having a size at least equal to one of said dimensions but narrower than the other dimension of the sheet, cooling the sheet over an area adjacent the heating area of a size at least equal to said one dimension but narrower than said other dimension of the sheet, the combined widths of the heating and cooling areas being less than said other dimension of the sheet, and continuously moving the sheet past the heating and cooling areas to progressively heat and then cool adjoining portions of the sheet.

5. A continuous process for heat treating glass sheets having a predetermined length and width comprising continuously moving said sheets one after the other from one point of support to another point of support, and continuously and progressively heating and then cooling successive narrow portions of each sheet on opposite sides thereof between the points of support while continuously moving the sheet from one point of support to the other, to thus complete the treatment.

6. The process as defined in claim 5 wherein the sheets are moved vertically from one point of support to the other.

7. The method of tempering an article of temperable material having predetermined dimensions which comprises heating the article over an area having a size at least equal to one of said dimensions but narrower than the other dimension of the article, cooling the article over an area adjacent the heating area of a size at least equal to said one dimension but narrower than said other dimension of the article, the combined widths of the heating and cooling areas being less than said other dimension of the article,, continuously moving the article past the heating and cooling areas to progressively heat and then cool adjoining portions of the article, and progressively heating and cooling the article in progressively lessened degrees over areas adjacent the first areas while continuously moving the article.

8. The method of tempering a glass article having predetermined dimensions which comprises heating the article over an area having a size at least equal to one of said dimensions but narrower than the other dimension of the article, cooling the article over an area adjacent the heating area of a size at least equal to said one dimension but narrower than said other dimension of the article by spraying on to the portion of the article within the cooling area a spray of cooling air, the combined widths of the heating and cooling areas being less than said other dimension of the article, and continuously moving the article past the heating and cooling areas to progressively heat and then cool adjoining portions of the article.

9. The process of continuously hardening a series of glass sheets having predetermined dimensions which comprises continuously moving the sheets one after the other from one point of support to another point of support, subjecting each successive sheet between the points of support to the direct action of electric radiating heat sufficient for heating the sheet to a hardenable temperature over a relatively narrow portion thereof, rapidly cooling the thus heated relatively narrow portion of the sheet between the points of support by subjecting the same to a spray of cooling air thereby hardening the same, and continuously moving the sheet at a predetermined speed from one point of support to the other.

10. The process of continuosly hardening a series of glass sheets as defined in claim 9 wherein the sheets are moved vertically downwardly from one point of support to the other.

11. The method of tempering an article of temperable material having predetermined dimensions which comprises heating the article over an area having a size at least equal to one of said dimensions but narrower than the other dimension of the article, cooling the article over an area adjacent the heating area of a size at least equal to said one dimension but narrower than said other dimension of the article by subjecting the portion of the article within the cooling area to a cooling fluid under pressure, the combined widths of the heating and cooling areas being less than said other dimension of the article, continuously moving the article past the heating and cooling areas to progressively heat and then cool adjoining portions of the article, and progressively heating and fluid cooling the article in progressively lessened degrees over areas adjacent the first areas while continuously moving the article.

12. The method of tempering a sheet of glass having predetermined dimensions which comprises heating the sheet over areas on opposite sides thereof to a predetermined degree, each of said areas having a size at least equal to one of said dimensions but narrower than the other dimension of the sheet, cooling opposite sides of the sheet over areas adjacent the heating areas of a size at least equal to said one dimension but narrower than said other dimension of the sheet, the combined widths of the heating and cooling areas adjacent respective sides of the sheet being less than said other dimension of the sheet, and continuously moving the sheet past the heating and cooling areas to progressively heat and then cool adjoining portions of the sheet.

13. A continuous process for heat treating glass sheets having a predetermined length and width comprising, continuously moving said sheets one after the other downwardly in a substantially vertical plane from one pair of spaced apart supports to another pair of spaced apart supports, and continuously and progressively heating and then cooling successive narrow portions of each sheet on opposite sides thereof and between the pairs of supports while continuously moving the sheets from the first pair of supports to the second pair of supports.

ARTHUR E. SPINASSE.

REFERENCES CITED

The following references are of record in the file of this patent:

UNITED STATES PATENTS

| Number | Name | Date |
|---|---|---|
| 820,205 | Keighley | May 8, 1906 |
| 876,267 | Colburn | Jan. 7, 1908 |
| 1,550,427 | Corl | Aug. 18, 1925 |
| 694,711 | Anderson | Mar. 4, 1902 |
| 1,887,414 | LeRoy | Nov. 8, 1932 |
| 1,266,625 | Rau | May 21, 1918 |
| 1,981,560 | Littleton | Nov. 20, 1934 |
| 2,009,748 | Sherwood | July 30, 1935 |
| 1,999,588 | Fox | Apr. 30, 1935 |
| 1,795,819 | Axell | Mar. 10, 1931 |

| Number | Name | Date |
|---|---|---|
| 170,339 | Brookfield | Nov. 23, 1875 |
| 711,287 | Colburn | Oct. 14, 1902 |
| 720,517 | Frink et al. | Feb. 10, 1903 |
| 1,413,766 | Myers | Apr. 25, 1922 |
| 2,197,811 | Spinasse | Apr. 23, 1940 |
| 1,420,181 | Clark | June 20, 1922 |
| 891,924 | George et al. | June 30, 1908 |
| 1,480,625 | Miller | Jan. 15, 1924 |
| 985,866 | Wadsworth | Mar. 7, 1911 |
| 1,373,533 | Slingluff | Apr. 5, 1921 |
| 1,367,858 | Campbell | Feb. 8, 1921 |
| 363,087 | Schreiber | May 17, 1887 |
| 1,585,542 | Henry | May 18, 1926 |
| 2,177,324 | Long | Oct. 24, 1939 |
| 245,248 | Weyer | Aug. 2, 1881 |
| 877,729 | Owens | Jan. 28, 1908 |
| 900,281 | Holmes | Oct. 6, 1908 |
| 1,944,625 | Ziegler | Jan. 23, 1934 |
| 198,804 | Luttges | Jan. 1, 1878 |
| 1,586,897 | Harris | June 1, 1926 |
| 1,646,498 | Seede | Oct. 25, 1927 |

FOREIGN PATENTS

| Number | Country | Date |
|---|---|---|
| 3,307 | British | 1875 |
| 816,096 | French | Apr. 26, 1937 |
| 25,925 | British | 1911 |